US012656315B2

(12) United States Patent
Zimmermann et al.

(10) Patent No.: US 12,656,315 B2
(45) Date of Patent: Jun. 16, 2026

(54) ION MOBILITY SPECTROMETER

(71) Applicant: GOTTFRIED WILHELM LEIBNIZ UNIVERSITÄT HANNOVER, Hannover (DE)

(72) Inventors: Stefan Zimmermann, Burgwedel (DE); Ansgar Kirk, Hannover (DE)

(73) Assignee: GOTTFRIED WILHELM LEIBNIZ UNIVERSITÄT HANNOVER, Hannover (DE)

( * ) Notice: Subject to any disclaimer, the term of this patent is extended or adjusted under 35 U.S.C. 154(b) by 1005 days.

(21) Appl. No.: 17/760,667

(22) PCT Filed: Sep. 23, 2020

(86) PCT No.: PCT/EP2020/076453
§ 371 (c)(1),
(2) Date: Aug. 18, 2022

(87) PCT Pub. No.: WO2021/058493
PCT Pub. Date: Apr. 1, 2021

(65) Prior Publication Data
US 2022/0390414 A1      Dec. 8, 2022

(30) Foreign Application Priority Data
Sep. 23, 2019      (DE) ..................... 10 2019 125 482.5

(51) Int. Cl.
*G01N 27/622*      (2021.01)
*G01N 27/64*      (2006.01)

(52) U.S. Cl.
CPC ........... *G01N 27/622* (2013.01); *G01N 27/64* (2013.01)

(58) Field of Classification Search
CPC ....... G01N 27/622; G01N 27/64; H01J 49/00; H01J 49/02; H01J 49/06; H01J 49/062; H01J 49/065; H01J 49/066
(Continued)

(56) References Cited

U.S. PATENT DOCUMENTS

| | | |
|---|---|---|
| 4,311,669 A | 1/1982 | Spangler |
| 4,445,038 A | 4/1984 | Spangler |

(Continued)

FOREIGN PATENT DOCUMENTS

| | | |
|---|---|---|
| DE | 69312471 T2 | 2/1998 |

OTHER PUBLICATIONS

Bunert E et al, "Shutterless ion mobility spectrometer with fast pulsed electron source", Feb. 13, 2017 (Feb. 13, 2017), Band 88, Nr. 2.

*Primary Examiner* — Jason L McCormack
(74) *Attorney, Agent, or Firm* — WCF IP

(57) ABSTRACT

The invention relates to an ion mobility spectrometer (1) having an ionization chamber (13), with at least one ionization source (3) and at least one drift chamber (14) arranged downstream of the ionization chamber (13) in a desired drift direction (D) of the ions, wherein the ionization chamber (13) is connected to a feed duct (4) through which a sample gas to be analysed can be fed into the ionization chamber (13), characterized in that the ion mobility spectrometer (1) has a discharge duct (5) separate from the feed duct (4), which discharge duct is connected to the ionization chamber (13) and through which the sample gas can be discharged from the ionization chamber (13), wherein a) the ion mobility spectrometer (1) is configured to operate the ionization chamber (13) substantially field-free, at least during an ionization phase, and, in an injection phase, to move ions by means of an electric field out of the ionization
(Continued)

Figures 1, 2:
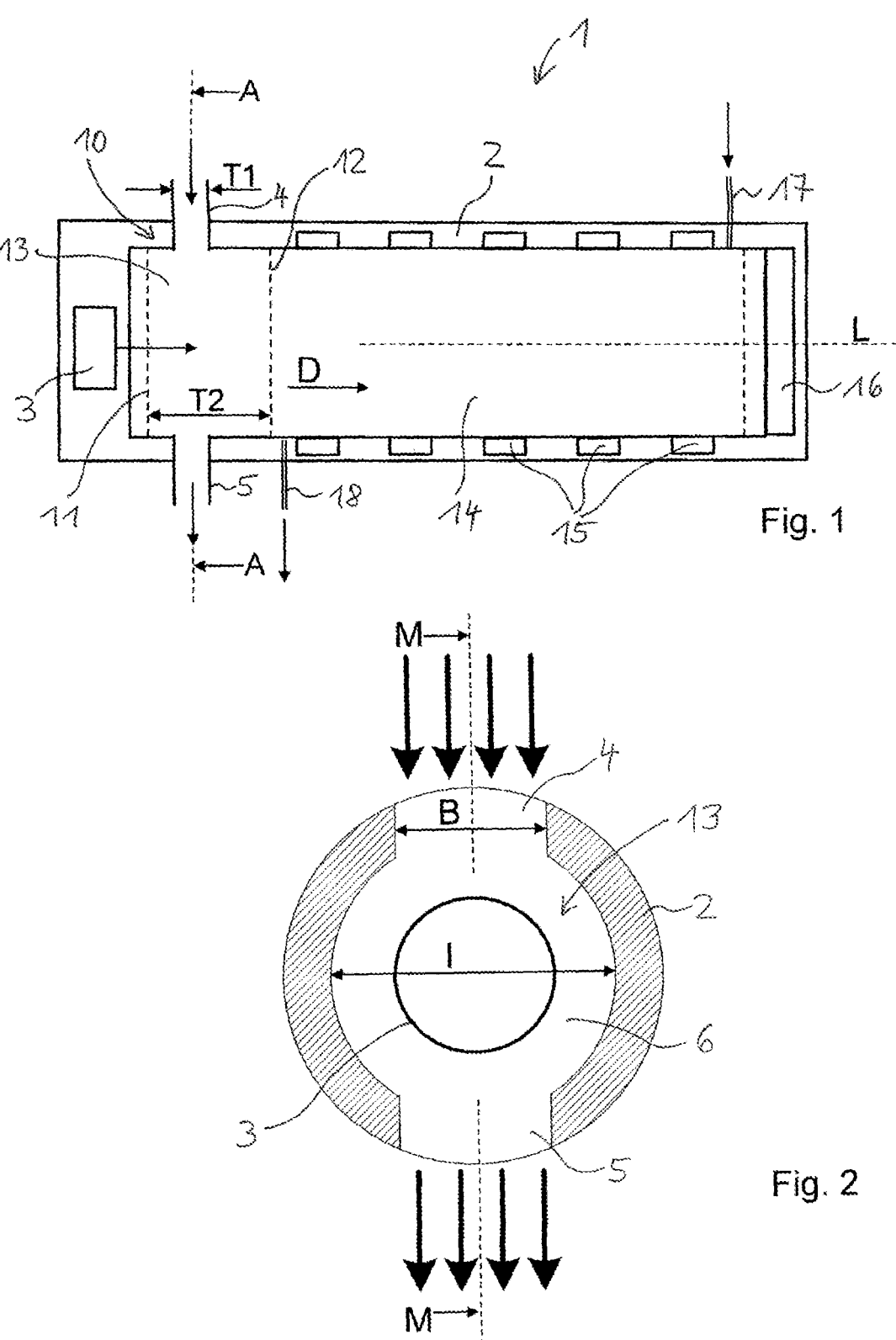

chamber (13) into the drift chamber (14) and/or b) the ionization source (3) is designed as a pulse-controlled ionization source.

20 Claims, 3 Drawing Sheets

(58) Field of Classification Search
USPC ........................................ 250/281, 282, 286
See application file for complete search history.

(56) References Cited

U.S. PATENT DOCUMENTS

| | | | | |
|---|---|---|---|---|
| 4,839,143 | A | * | 6/1989 | Vora ...................... G01N 27/623 |
| | | | | 324/470 |
| 5,189,301 | A | * | 2/1993 | Thekkadath ......... G01N 27/622 |
| | | | | 250/281 |
| 5,200,614 | A | * | 4/1993 | Jenkins ................ G01N 27/622 |
| | | | | 250/382 |
| 5,218,203 | A | * | 6/1993 | Eisele .................... G01N 27/66 |
| | | | | 250/288 |
| 9,147,565 | B1 | * | 9/2015 | Goedecke ............ G01N 27/622 |
| 2004/0164238 | A1 | * | 8/2004 | Xu ........................ H01J 49/168 |
| | | | | 250/287 |
| 2008/0182604 | A1 | * | 7/2008 | Kihara .................... H04L 69/40 |
| | | | | 455/466 |
| 2015/0115152 | A1 | | 4/2015 | Zhang et al. |
| 2015/0279648 | A1 | * | 10/2015 | Furtaw ................ H01J 49/0418 |
| | | | | 250/282 |

* cited by examiner

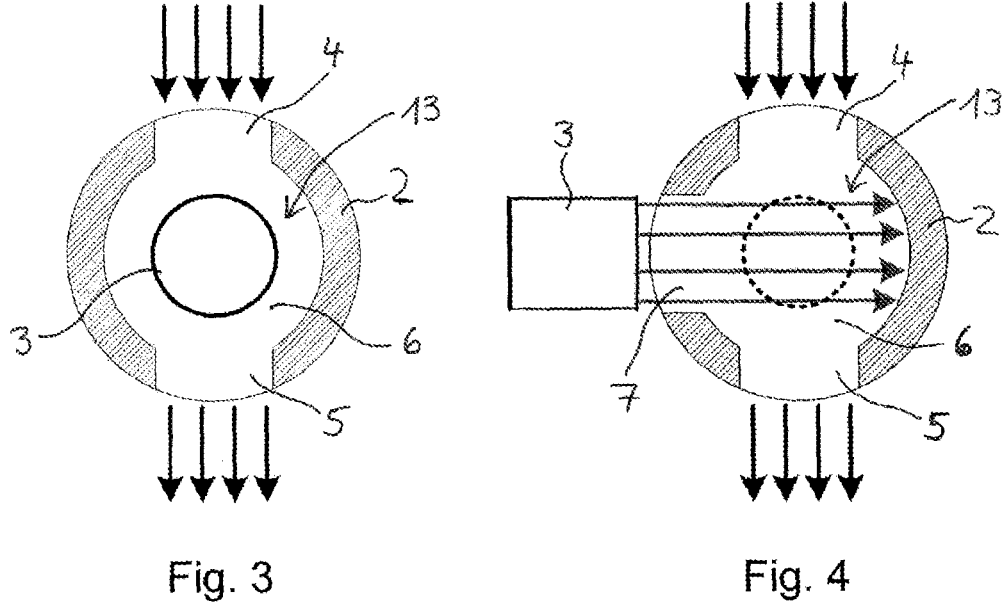
Fig. 3                    Fig. 4
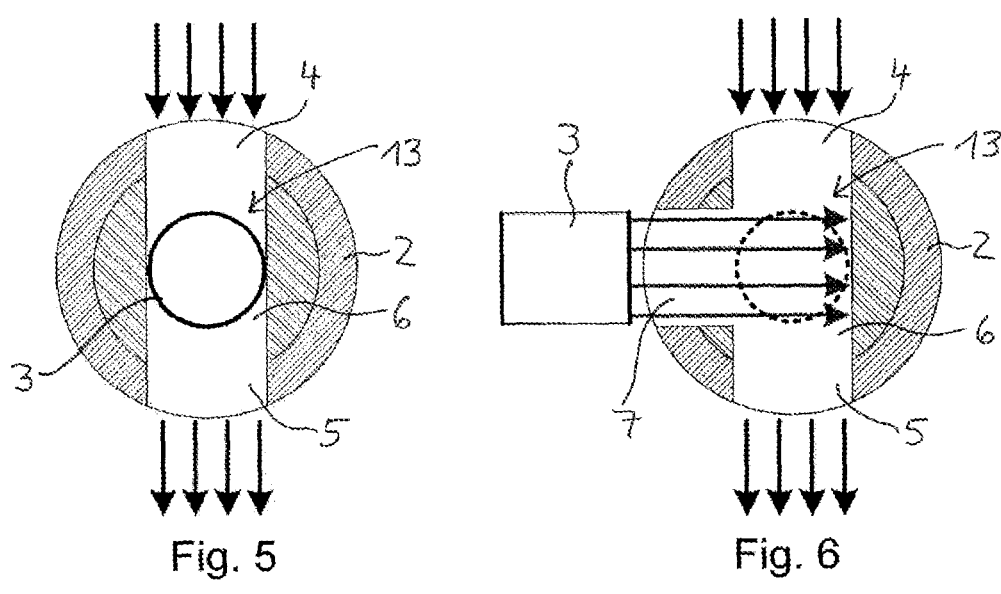
Fig. 5                    Fig. 6

ION MOBILITY SPECTROMETER

The invention relates to an ion mobility spectrometer with an ionization chamber, with at least one ionization source and at least one drift chamber downstream of the ionization chamber in a desired drift direction of the ions, wherein the ionization chamber is connected to a feed channel through which a sample gas to be analyzed can be fed to the ionization chamber.

Ion mobility spectrometers (IMS) are used for the analysis of substances contained in gaseous media and which usually occur only at very low concentrations. Ion mobility spectrometers are frequently employed in combination with a highly efficient chemical atmospheric pressure ionization (APCI) as fast and sensitive trace gas detectors. Systems with field switching shutters are particularly sensitive. In these, the region in which the ionization of the analyte molecules takes place, known as the ionization chamber, is essentially free from fields during the ionization. This ionization chamber is usually delimited by two essentially parallel electrodes, wherein at least one of the electrodes is designed as a grid electrode. As a result of switching the electric field on rapidly, which gives the technique its name, the ions are then output into the drift region of the IMS as a compressed packet. Alternatively, the electric field can be present permanently between the two electrodes, and the ionization source can be pulsed instead.

Feeding in the sample, however, represents a particular difficulty for this type of ion gate, i.e. the field switching shutter. Because the ion packet is positioned in the ionization chamber, or only a short ionization pulse takes place in this ionization chamber, it is only through effective distribution of the sample gas that an efficient mixture, and thereby ionization, can be ensured.

The invention is based on the object of providing an ion mobility spectrometer that is improved in respect of the problem described above.

This object is achieved with an ion mobility spectrometer of the type referred to at the beginning, in that the ion mobility spectrometer has a discharge channel that is separate from the feed channel and is connected to the ionization chamber, through which the sample gas can be discharged from the ionization chamber. This means that the ionization chamber can be designed to be operated essentially without field at least during an ionization phase, wherein, during an injection phase using an electric field, ions are moved out of the ionization chamber into the drift chamber, for example by means of a field switching shutter, and/or the ionization source can be designed to be operated as a pulsed ionization source. The invention has the advantage that the sample gas can be supplied very efficiently, and thereby advantageously for a highly sensitive measurement by the ion mobility spectrometer. An effective distribution of the sample gas, and thereby an efficient ionization of the ionization chamber, can be created in this way. In particular, unwanted eddying of the sample gas and unwanted mixing with other gas flows supplied to the ion mobility spectrometer, such as, for example, a flow of drift gas, can be avoided.

The ion mobility spectrometer can be configured so that the ionization chamber is operated essentially without field at least during an ionization phase, and that during an injection phase ions are moved out of the ionization chamber into the drift chamber by means of an electric field. In addition to the two states referred to of the "ionization phase" and the "injection phase", one or a plurality of further states can be present in which the ionization chamber can be operated essentially without field or with field.

The sample gas comprises the analyte molecules that are to be analyzed by means of ion mobility spectrometry, and are converted by ionization into analyte ions and guided through the drift chamber by electric fields.

According to an advantageous embodiment of the invention, it is provided that the feed channel and/or the discharge channel open directly into the ionization chamber. A particularly efficient, low-resistance guidance of the sample gas through the ionization chamber is ensured in this way.

According to an advantageous embodiment of the invention, it is provided that as a result of the arrangement of the feed channel and of the discharge channel, a flow direction of the sample gas is defined by the ionization chamber which extends orthogonally to the drift direction of the ions through the drift chamber. The gas flow of the sample gas thus flows through the ionization chamber transversely to the drift direction. This too is favorable for an effective distribution of the sample gas, and thereby an efficient ionization of the ionization chamber.

At its outer end, the feed channel can be directly connected to the atmosphere, or to an inlet system such as, for example, a membrane, a sample loop or a thermal desorber, or with a preliminary separation system such as, for example, a gas chromatograph. The coupling of the feed channel with a preliminary separation system is advantageous in particular, since a laminar flow of sample gas is ensured by the sample gas feed, and eddies are avoided. The sample is thus fed through the ionization chamber efficiently, and without further mixing, and the separation achieved through the preliminary separation is retained.

According to an advantageous embodiment of the invention, it is provided that the discharge channel is connected to the surrounding atmosphere or to a suction device. This permits efficient removal of the sample gas from the ionization chamber. The suction device can, for example, be a pump. A mass flow regulator or a pressure regulator can be placed additionally between the suction device and the discharge channel in order to control the removal of the sample gas.

It is provided according to an advantageous embodiment of the invention that the feed channel and/or the discharge channel comprises an interior wall of an inert material, in particular of glass or with an inert coating, in particular of glass and/or SilcoNert. It is hereby ensured that the sample gas is not contaminated in an unwanted manner by other media, which could lead to falsifying the measurement. The inert material is here in particular chosen to be inert with respect to the sample gas, usually air with analyte molecules contained therein.

According to a further embodiment, it is provided that the feed channel and/or the discharge channel is not formed of a single opening, but of a plurality of smaller openings. The totality of these openings are then to be considered as the feed channel or the discharge channel.

According to an advantageous embodiment of the invention, it is provided that the ionization source a) is arranged inside the ionization chamber or at least partially forms one of the walls of the ionization chamber and/or b) is arranged outside the ionization chamber and is connected to the ionization chamber via an ionization channel that opens into the ionization chamber.

The ionization source can, for example, be designed to carry out a chemical ionization of the analyte molecules by means of reactant ions, triggered, for example, by a radioactive or non-radioactive electron source, x-ray radiation or a dielectric barrier discharge. In this case it is possible for the reactant ions to be generated first outside the ionization chamber, and to be moved into the ionization chamber for ionization of the analyte molecules. Direct ionization by means, for example, of ultraviolet radiation or a laser is also possible. A radioactive ionization source can, for example, be a tritium source or a nickel source.

As has been explained, the ion mobility spectrometer according to the invention can be designed in such a way that the ionization chamber is operated in a manner that is essentially free from fields during an ionization phase. During the ionization phase there is thus essentially no electric field present in the ionization chamber, so that ions that are located there initially stay in place, and are thus not moved by electric fields. Only when an ion gate or a shutter is switched on are the ions moved from the ionization chamber to the drift chamber, and then guided by further electric fields through the drift chamber to an ion detector.

According to an advantageous embodiment of the invention, it is provided that the ion mobility spectrometer comprises at least one ion gate in the form of a field switching shutter. This permits a particularly efficient provision of analyte ions in the ionization chamber.

A field switching shutter comprises a counter electrode and an injection electrode. The distance between the electrodes can, for example, be small, advantageously smaller than the internal diameter of the drift chamber, or smaller than 10 mm, or smaller than 5 mm. When a field switching shutter is employed, the ionization, i.e. the provision of ions from a sample, takes place in a field-free or nearly field-free space that is also referred to as the ionization chamber. When an analysis step is then to be carried out, the electrodes of the field switching shutter are accordingly switched over for an injection phase, i.e. at least one electrode is switched over, whereby the ions are set in motion in the direction of the drift chamber. The ionization chamber is located between the counter electrode and the injection electrode, while the drift chamber of the ion mobility spectrometer, as seen from the ionization chamber, is arranged behind the injection electrode. Through appropriate switching of the potentials of the electrodes of the field switching shutter, ions that have been provided in the ionization chamber can be output as an ion packet into the drift chamber, where they are guided by an electric field generated there along the drift chamber to an ion detector at which the detection of the arriving ions takes place. The electric field strength within the ionization chamber can advantageously be higher during the injection phase than the electric field strength in the drift chamber, for example more than three times as high. Ion mobility spectrometers with this type of construction can also be constructed in a particularly compact form and realized particularly economically because there for example an additional reaction chamber, as is known from DE 10 2015 112 869 A1, does not have to be arranged in front of the drift chamber. The ion mobility spectrometer can accordingly be designed such that an electric field in the ionization chamber is generated by only the electrodes of the field switching shutter, so that an additional field generation device for generating an electric field in the ionization chamber is not necessary.

With a field switching shutter, the ionization chamber is thus essentially free from electric fields at least during the ionization phase. To achieve this state of the absence of field in the ionization chamber, equal potentials can be present at the counter electrode and the injection electrode of the field switching shutter. It is also possible for a small potential difference to be applied between the counter electrode and the injection electrode in order to compensate for field penetration of the electric field from the drift chamber. In this case, the potential difference between the counter electrode and the injection electrode does not however bring about the generation of an electric field in the ionization chamber, but works against the penetration of field from the drift chamber, and thus compensates the state in the ionization chamber bringing it in the direction of a field-free state.

In addition or alternatively, the ion mobility spectrometer can comprise an ionization source that is operated in a pulsed manner, for example an ionization source capable of fast pulsing. In this case, the ionization source only outputs ionizing radiation for a specific period of time. Ion packets can thus be generated directly in the region through which the ionizing radiation is passing by switching the ionization source. In this case, switching the ion gate can be omitted, and the field switching shutter is permanently in the injection phase, meaning that an electric field is permanently present between the counter electrode and the injection electrode. The ion mobility spectrometer can in this case also be realized without an ion gate or a field switching shutter at all. Only a field generation device, with, for example, two electrodes, is then necessary to generate an electric field by which the ions are moved out of the ionization chamber into the drift chamber.

As already described, an electric field strength within the ionization chamber can advantageously be greater than the electric field strength in the drift chamber. The pulsed ion injection takes place through fast pulsing of the ionization source, for example with a pulse duration shorter than 100 μs, or shorter than 10 μs.

Other variants of field switching shutters can alternatively also be used in combination with the sample gas feed according to the invention such as, for example, a field switching shutter with additional electrodes according to patent application DE 10 2018 107 909.5.

Alternatively, according to patent application DE 10 2018 107 910.9, a second field switching shutter with a second drift chamber can be connected to the same ionization chamber. The ion mobility spectrometer is then designed as a double-tube ion mobility spectrometer.

The feed channel and the discharge channel can, for example, be arranged at an angle to one another. Due to the arrangement of the feed channel and the discharge channel, the sample gas can flow through the ionization space essentially orthogonally to the desired drift direction D of the ions in the drift chamber. It is advantageous here for the sample gas to flow through the majority of the region between the injection electrode and the counter electrode of the field switching shutter.

According to an advantageous embodiment of the invention, it is provided that the central axis of the feed channel is essentially collinear with the central axis of the discharge channel. In other words, the feed channel and the discharge channel are designed as axially aligned channels. This allows the sample gas to be guided through the ion mobility spectrometer in a manner favorable to the flow. In particular, eddies in the sample gas flow can largely be avoided.

According to an advantageous embodiment of the invention it is provided that the feed channel is connected from its mouth in the ionization chamber via a connecting channel formed in the ionization chamber to the mouth of the discharge channel in the ionization chamber, wherein the connecting channel is designed as a laminar flow body. This allows the sample gas to be guided through the ionization chamber as a laminar gas flow, which is favorable for a particularly efficient ionization of the analyte ions. Eddies in the sample gas flow are largely avoided.

According to an advantageous embodiment of the invention, it is provided that the cross-sectional area of the connecting channel differs from the cross-sectional area of the feed channel and/or of the discharge channel by less than ±50%, or less than ±35% or less than ±25%. It can also be provided that the width and depth of the connecting channel differs from the width and depth of the feed channel and/or of the discharge channel by less than ±50%, or less than ±35% or less than ±25%. Accordingly, there is in any event a slight variation in the cross-section along the gas flow path of the sample gas through the ionization chamber. The variation in the cross-sectional area along the gas flow path can also be equal to zero, which means that the cross-sectional area does not change along the entire gas flow path from the feed channel, through the connecting channel and the discharge channel.

According to an advantageous embodiment of the invention, it is provided that the feed channel and/or the discharge channel has an essentially square, circular, rectangular or elliptical cross-section. In this way relatively large cross-sections can be realized for the guidance of the sample gas with a stable construction of the ion mobility spectrometer at the same time.

According to an advantageous embodiment of the invention, it is provided that the width of the feed channel and/or of the discharge channel is at least 10% of the internal diameter of the drift chamber, or at least 20%, or at least 30%. A comparatively large flow cross-section can be provided in this way for the sample gas along the path through the ionization chamber. The dimension that extends orthogonally to the longitudinal axis of the ion mobility spectrometer and orthogonally to the central axis of the feed channel or of the discharge channel is taken to be the width of the feed channel and/or of the discharge channel.

According to an advantageous embodiment of the invention, it is provided that the depth of the feed channel and/or of the discharge channel is at least 10% of the depth of the ionization chamber, or at least 20%, or at least 30%. A comparatively large flow cross-section can be provided in this way for the sample gas along the path through the ionization chamber. The "depth" dimension extends here in the longitudinal direction of the drift chamber or in the drift direction D.

According to an advantageous embodiment of the invention, it is provided that the width of the feed channel and/or of the discharge channel differs from the diameter of the ion detector of the ion mobility spectrometer by less than ±50%, or less than ±35%, or less than ±25%. This enables a particularly efficient provision of a large-area ion packet in the ion chamber, so that a comparatively large number of analyte ions can be fed to the ion detector in each ion mobility spectrometry measurement.

According to an advantageous embodiment of the invention, it is provided that the width of the feed channel and/or of the discharge channel differs from the diameter of an axially mounted ionization source by less than ±50%, or less than ±35%, or less than ±25%. This enables a particularly efficient provision of a large-area ion packet in the ion chamber, so that a comparatively large number of analyte ions can be fed to the ion detector in each ion mobility spectrometry measurement.

According to an advantageous embodiment of the invention, it is provided that the depth of the feed channel and/or of the discharge channel differs from the diameter or the depth of an ionization source mounted orthogonally to the longitudinal axis L of the ion mobility spectrometer by less than ±50%, or less than ±35%, or less than ±25%. This enables a particularly efficient provision of a large-area ion packet in the ion chamber, so that a comparatively large number of analyte ions can be fed to the ion detector in each ion mobility spectrometry measurement.

According to an advantageous embodiment of the invention, it is provided that the cross-sectional area of the discharge channel differs from the cross-sectional area of the feed channel by less than ±50%, or less than ±35%, or less than ±25%. It can also be provided that the width and depth of the discharge channel differs from the width and depth of the feed channel by less than ±50%, or less than ±35%, or less than ±25%. Accordingly, there is in any event a slight variation in the cross-section along the gas flow path of the sample gas through the ionization chamber. The cross-sectional areas of the discharge channel and of the feed channel can also be equal.

According to an advantageous embodiment of the invention, it is provided that a drift gas is guided through the drift chamber in a direction opposite to the desired drift direction of the ions, wherein the drift gas flow does not cross over the sample gas flow through the ionization chamber. Unwanted eddies in the flow of the sample gas and an unwanted mixing or contamination of the sample gas flow with parts of the drift gas would also be hereby avoided.

According to an advantageous embodiment of the invention, it is provided that the ion mobility spectrometer comprises a drift gas outlet channel through which drift gas fed into the drift chamber can be discharged, wherein the drift gas outlet channel is constructed separately from the discharge channel. This has the advantage that the drift gas can be guided through the ion mobility spectrometer separately from the sample gas, without resulting in unwanted crossovers between the gas currents. The predominant portion of the drift gas, or all of the drift gas, can be released here through the drift gas outlet channel. It is also advantageous to let out a proportion of the drift gas via the ionization chamber through the discharge channel in order thus to flush the ion gate. Focusing the flow of the sample gas between the feed channel and the discharge channel can also be achieved in this way, meaning that a widening of this flow in the direction of the drift chamber is prevented. Depending on the implementation of the feed channel and/or of the discharge channel, the ion mobility spectrometer can also be designed entirely without a special drift gas outlet, and it is possible for the drift gas only to be released through the discharge channel, for example if the drift gas flow is small or of a similar size in comparison with the flow of sample gas.

According to an advantageous embodiment of the invention, it is provided that the drift gas outlet channel opens directly into the drift chamber. The drift gas outlet channel can, for example, be arranged adjacent to the ion gate at the drift chamber.

The drift gas can, for example, be allowed into the drift chamber via a drift gas inlet channel that is arranged at the drift chamber near to the ion detector, and released again outside the ionization chamber, for example close to the ion gate. The inlet region of the drift gas can here be distributed axially over the cross-section of the drift chamber at individual points, for example by means of a diffuser, or be implemented radially over the majority of the circumference of the drift chamber. The outlet of the drift gas can here also occur at individual points, or radially over the majority of the circumference of the drift chamber. In this case it is advantageous either to omit all of the flow of drift gas at this point or to have a somewhat lower flow of the drift gas in order to prevent contamination of the drift chamber by diffusion resulting from the drift gas flowing through the ion gate into the discharge channel.

In addition to this, it is advantageous to introduce clean gas at further points in order on the one hand to further increase the focusing of the flow of the sample gas between the feed channel and the discharge channel described above, and on the other hand to minimize contamination of surfaces, in particular in the ionization chamber. Advantageously, all the clean gas introduced in this way is released through the discharge channel in order to maximize the said focusing. The introduction of clean gas through openings in the counter electrode is, for example, advantageous here. Particularly advantageous here is a symmetry in the focusing by the drift gas, meaning that the clean gas is introduced over the majority of the surface of the counter electrode, and the quantity of gas introduced in this way corresponds roughly to the quantity of drift gas that is released through the discharge channel. The difference is, for example, less than 50% or less than 20%. It is also advantageous to guide clean gas through the ionization channel/channels when the ionization sources are attached orthogonally, which also leads to focusing the flow of the sample gas and prevents contamination of the ionization sources. If the width and/or depth of the feed channel is less than the width or depth of the ionization chamber, it is also advantageous to introduce clean gas in the same direction as the sample gas on the remaining surface of the ionization chamber.

The invention is explained in more detail below with reference to exemplary embodiments and making use of drawings. Here FIG. 1 shows a schematic illustration of an ion mobility spectrometer, and FIG. 2 shows a sectional illustration through the ion mobility spectrometer according to FIG. 1 along the cut plane A-A, and FIGS. 3 to 7 show further cross-sectional illustrations of embodiments of the ion mobility spectrometer in the cut plane A-A.

FIG. 1 shows an ion mobility spectrometer 1 with a housing 2. An ionization chamber 13 and a drift chamber 14 are present in the housing 2. The ion mobility spectrometer 1 comprises an ion gate 10 in the region of the ionization chamber 13, for example in the form of a field switching shutter with an injection electrode 12 and a counter electrode 11. The ionization chamber 13 is then arranged between the injection electrode 12 and the counter electrode 11. The ionization source 3 can, moreover, also simultaneously constitute the counter electrode 11. The drift chamber 14 follows the ionization chamber 13 or the injection electrode 12 in a desired drift direction D of the ions. The drift chamber 14 ends at an ion detector 16. A field generation device 15 is present in the region of the drift chamber 14, for example in the form of annular electrodes surrounding the drift chamber 14. An electric field can be generated in the drift chamber 14 by the field generation device 15, exercising the desired drift effect on the ions under examination, so that these are transported from the ion gate 10 to the ion detector 16.

The ion mobility spectrometer 1 also comprises an ionization source 3 through which ions are made available in the ionization chamber 13. The ionization chamber 13 is connected to a feed channel 4 leading through the housing 2 and a discharge channel 5 also leading through the housing 2. The feed channel 4 serves to supply sample gas to the ionization chamber 13, and the discharge channel 5 to remove sample gas from the ionization chamber 13. A flow of sample gas can be generated in this way through the ionization chamber 13 from the feed channel 4 to the discharge channel 5. As can be seen, the discharge channel 5 is constructed separately from the feed channel 4.

A flow of drift gas can also be guided through the drift chamber 14. The drift chamber 14 comprises a drift gas inlet channel 17 and a drift gas outlet channel 18 for this purpose. The drift gas is thus guided to the drift gas outlet channel 18 in the direction opposite to the drift direction D. As can be seen, the drift gas outlet channel 18 is constructed separately from the discharge channel 5 and from the feed channel 4.

FIG. 2 shows a cross-sectional illustration of the ion mobility spectrometer 1 in the region of the ionization chamber 13 (corresponding to the cut plane A-A). It can be seen that the sample gas can be introduced through the feed channel 4 into the ionization chamber 13, and can be removed again through the discharge channel 5. The feed channel 4 is connected to the discharge channel 5 via a connecting channel 6 inside the ionization chamber 13. It is advantageous here if the width B of the feed channel 4 corresponds approximately to the width of the discharge channel 5, or at least does not differ from it greatly. It is furthermore advantageous to give the feed channel 4 and/or the discharge channel 5 a relatively large width B, corresponding for example to the diameter of the ion detector 16, or at least 10% of the internal diameter I of the drift chamber 14.

To generate a laminar flow of the sample gas through the ion mobility spectrometer, it is advantageous if the feed channel 4 and the discharge channel 5 are arranged essentially in axial alignment, or are at least placed on opposite sides of the ionization chamber 13.

From the manufacturing point of view, the feed channel 4 or the discharge channel 5 can be created, for example, through laterally milling the wall of the housing 2. The feed channel 4 or the discharge channel 5 can also be formed of a plurality of many individual adjacent channels or holes.

FIGS. 3 and 4 show further embodiments of the ion mobility spectrometer in respect of the supply of sample gas. FIG. 3 here corresponds to the embodiment already explained with reference to FIG. 2. In this embodiment, the ionization source 3 is mounted axially with respect to the longitudinal axis L of the ion mobility spectrometer 1 or of the drift chamber 14. The ionization source 3 can, for example, be implemented as a tritium source or as a UV source. The ionization source 3 can, moreover, also simultaneously constitute the counter electrode 11. If the ion detector 16 is sufficiently large, the principal ionization region in the ionization chamber 13 corresponds largely to the size of the ionization source 3.

FIG. 4 shows an embodiment in which the ionization source 3 is mounted away from the axis, for example orthogonally to the longitudinal axis L of the ion mobility spectrometer 1, and accordingly also radiates orthogonally to this into the ionization chamber 13. In this case, the ionization source 3 can, for example, be an x-ray source, a UV source or a laser. In this case, the ion mobility spectrometer 1 has an ionization channel 7 in the region of the ionization chamber 13, through which the radiation of the ionization source 3 is guided into the ionization chamber 13. The ionization channel 7 can be designed in a similar manner to the feed channel 4 or the discharge channel 5. The ionization channel 7 can, for example, be realized by a lateral milling in the housing 2. The primary ionization region here corresponds to the ion detector 16 indicated with a dashed line.

FIG. 5 shows an embodiment whose ionization source 3 is comparable to that of FIG. 3. In contrast to FIG. 3, the connecting channel 6 is made narrower, for example as a channel extending linearly without an enlargement or reduction in the cross-section. A laminar flow-through of the sample gas can be ensured in this way in a particularly efficient manner.

FIG. 6 shows an embodiment similar to that of FIG. 4, in which the ionization source 3 outputs its radiation into the ionization chamber 13 laterally through the ionization channel 7. The connecting channel 6 is comparable in design to that of FIG. 5, wherein, in this case, the ionization channel 7 opens into the connecting channel 6.

Figure 7:
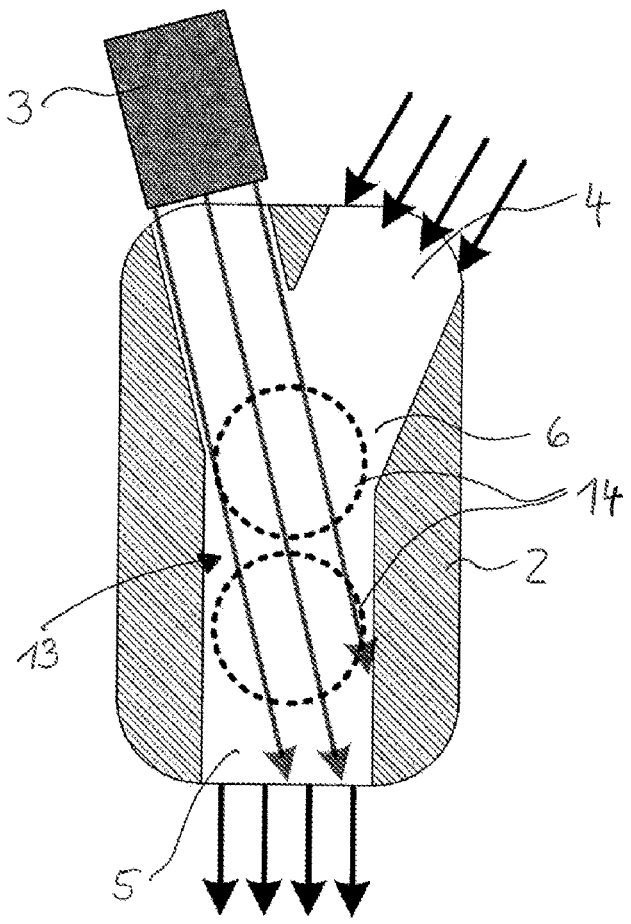

FIG. 7 shows an embodiment similar to that of FIG. 4, having however two parallel or nearly parallel drift chambers 14 according to DE 10 2018 107 910.9, with a common ionization chamber 13. The positions of the two ion detectors 16, and thereby the resulting primary ionization regions, are shown dashed. Since here the ionization source 3, the feed channel 4 and the discharge channel 5 are arranged orthogonally with respect to the drift direction, and the flow is to pass through the two primary ionization regions, an angled arrangement results between the ionization source 3 and the feed channel 4 or discharge channel 5 located at its side.

The invention claimed is:

1. An ion mobility spectrometer, comprising:
an ionization chamber comprising at least one ionization source;
at least one drift chamber, wherein the at least one drift chamber is downstream of the ionization chamber in a drift direction of the ions;
a feed channel connected to the ionization chamber, through which a sample gas to be analyzed is fed to the ionization chamber;
a discharge channel that is separate from the feed channel and is connected to the ionization chamber such that the sample gas is dischargeable from the ionization chamber through the discharge channel,
wherein
the at least one ionization source is designed to be operated in a pulsed manner, and wherein the at least one ionization source comprises at least one ion gate comprising a counter electrode and an injection electrode, wherein an electrical field between the counter electrode and the injection electrode is permanent.

2. The ion mobility spectrometer as claimed in claim 1 wherein an arrangement of the feed channel and of the discharge channel provides a flow direction of the sample gas which extends orthogonally to the drift direction of the ions through the drift chamber.

3. The ion mobility spectrometer as claimed in claim 1 wherein the discharge channel is connected to a surrounding atmosphere or to a suction device.

4. The ion mobility spectrometer as claimed in claim 1 wherein the feed channel is connected to a surrounding atmosphere or to an inlet system.

5. The ion mobility spectrometer as claimed in claim 1 wherein the feed channel and/or the discharge channel comprises an interior wall of an inert material or with an inert coating.

6. The ion mobility spectrometer as claimed in claim 1 wherein the at least one ionization source
a) is arranged inside the ionization chamber or at least partially forms at least one wall of the ionization chamber and/or
b) is arranged outside the ionization chamber and is connected to the ionization chamber via an ionization channel that opens into the ionization chamber.

7. The ion mobility spectrometer as claimed in claim 1 wherein the at least one ion gate is in a form of a field switching shutter.

8. The ion mobility spectrometer as claimed in claim 1 wherein a central axis of the feed channel is essentially collinear with a central axis of the discharge channel.

9. The ion mobility spectrometer as claimed in claim 1 wherein the feed channel is connected from a mouth of the feed channel in the ionization chamber via a connecting channel formed in the ionization chamber to a mouth of the discharge channel in the ionization chamber, wherein the connecting channel is designed as a laminar flow body.

10. The ion mobility spectrometer as claimed in claim 9, wherein a cross-sectional area of the connecting channel differs from a cross-sectional area of the feed channel by less than ±50%.

11. The ion mobility spectrometer as claimed in claim 1 wherein the feed channel and/or the discharge channel has an essentially square, circular, rectangular or elliptical cross-section.

12. The ion mobility spectrometer as claimed in claim 1 wherein a width of the feed channel is at least 10% of an internal diameter of the drift chamber.

13. The ion mobility spectrometer as claimed in claim 1 wherein a depth of the feed channel and/or of the discharge channel is at least 10% of a depth of the ionization chamber.

14. The ion mobility spectrometer as claimed in claim 1 wherein a width of the feed channel and/or of the discharge channel differs from a diameter of the ion detector of the ion mobility spectrometer by less than ±50%.

15. The ion mobility spectrometer as claimed in claim 1 wherein a width of the feed channel and/or of the discharge channel differs from a diameter of an axially mounted ionization source of the at least one ionization source of the ion mobility spectrometer by less than ±50%.

16. The ion mobility spectrometer as claimed in claim 1 wherein a cross-sectional area of the discharge channel differs from a cross-sectional area of the feed channel by less than ±50%.

17. The ion mobility spectrometer as claimed in claim 1 further comprising a drift gas outlet channel through which drift gas fed into the drift chamber is dischargeable, wherein the drift gas outlet channel is constructed separately from the discharge channel.

18. The ion mobility spectrometer as claimed in claim 17 wherein the drift gas outlet channel opens directly into the drift chamber.

19. The ion mobility spectrometer as claimed in claim 1 further comprising a housing and the ionization chamber comprises a chamber formed in said housing, wherein the feed channel comprises at least one passage extending through the housing into the ionization chamber or the feed channel comprises at least one passage extending from the ionization chamber through the housing.

20. The ion mobility spectrometer as claimed in claim 1 further comprising a drift chamber field generation device that comprises annular electrodes surrounding the drift chamber.

* * * * *